United States Patent [19]
Nishizawa et al.

[11] Patent Number: 5,708,192
[45] Date of Patent: Jan. 13, 1998

[54] PHOTOSENSOR EQUIPPED DEVICE FOR DETECTING PERFORATIONS

[75] Inventors: Akio Nishizawa, Kawasaki; Hiroshi Wakabayashi, Yokohama, both of Japan

[73] Assignee: Nikon Corporation, Tokyo, Japan

[21] Appl. No.: 635,574

[22] Filed: Apr. 22, 1996

[30] Foreign Application Priority Data

May 9, 1995 [JP] Japan ................... 7-110896

[51] Int. Cl.$^6$ ................... G03B 17/24
[52] U.S. Cl. ................ 73/37; 73/157; 73/DIG. 11; 354/105; 354/173.1; 354/215; 354/217
[58] Field of Search ................ 73/37, DIG. 11, 73/12.03, 157, 863.91; 354/105, 106, 75–76, 212, 213, 214, 173.11

[56] References Cited

U.S. PATENT DOCUMENTS

| | | | |
|---|---|---|---|
| 1,791,288 | 2/1931 | Schweitzer | 73/DIG. 11 |
| 2,244,507 | 6/1941 | Thomas | 88/14 |
| 3,723,650 | 3/1973 | Bradley et al. | 178/7.2 |
| 5,147,169 | 9/1992 | Miller et al. | 414/403 |
| 5,155,511 | 10/1992 | Tamamura | 354/76 |
| 5,287,136 | 2/1994 | Kitagawa et al. | 354/173.1 |
| 5,307,100 | 4/1994 | Kubo | 354/105 |
| 5,517,266 | 5/1996 | Funaki et al. | 354/106 |

*Primary Examiner*—Hezron E. Williams
*Assistant Examiner*—J. David Wiggins
*Attorney, Agent, or Firm*—Oliff & Berridge

[57] ABSTRACT

A device for detecting perforations in film includes a camera body or other optical instrument body. A pressure plate is disposed at a rear of the body and has a channel that allows access of a sensor output to detect and read film position via the recognition of such perforations in the moving film as it passes through the camera or optical instrument body. The pressure plate maintains the alignment of the film relative to the body. An installation board is aligned and mounted adjacent a rear of the pressure plate. A sensor is attached to the installation board. The sensor is disposed to face a section of the film having perforations through the channel of the pressure plate as the film moves along a film path. The sensor transmits electronic signals corresponding to the position of perforations of the film as the film moves along the film path. The invention provides for the efficient and economical construction of a device having a sensor for detecting perforations in film.

13 Claims, 3 Drawing Sheets

PHOTOSENSOR EQUIPPED DEVICE FOR DETECTING PERFORATIONS

BACKGROUND OF THE INVENTION

1. Field of the Invention

This invention relates to a device for determining the position of moving film by detecting perforations in the film.

2. Description of Related Art

Conventional cameras are equipped with photosensors. For example, Japan Laid Open Patent Publication 6-194710 discloses a camera having photosensor for detecting the perforations of film. The photosensor outputs a signal via electric wires. The photosensor is attached directly to a pressure plate. The pressure plate maintains the alignment of the film by contact with the film. The position of each photographic frame of film is determined based upon the output of the photosensor. The photosensor is hard to wire since it is attached directly to the pressure plate. The assembly of a conventional camera having a photosensor is, therefore, awkward.

SUMMARY OF THE INVENTION

It is, therefore, an object of the present invention to assemble efficiently a device having a photosensor for detecting perforations in film.

The present invention includes a photosensor that detects perforations in film and transmits this data via electric wires to a control circuit. The photosensor is incorporated into a device for detecting and controlling the position of moving film. The device determines position of the film, and stops the film, based upon the output of the photosensor.

The invention also includes a pressure plate that has a channel. The pressure plate maintains the alignment of film relative to a camera body. The photosensor is installed on an installation board or printed circuit board. The installation board is disposed such that the photosensor faces a section of the film having perforations through the channel of the pressure plate.

The photosensor and its wires are installed on the installation board or printed circuit board, instead of directly on the pressure plate. The invention, therefore, provides for the efficient assembly of a device having a photosensor for detecting perforations in film.

Furthermore, in explaining the present invention, in order to make the present invention more understandable, utilization is made of a drawing of an actual embodiment using the operational items and the means used to resolve the above problems. However, the present invention is not limited to this embodiment.

DETAILED DESCRIPTION OF PREFERRED EMBODIMENTS

Figure 1:
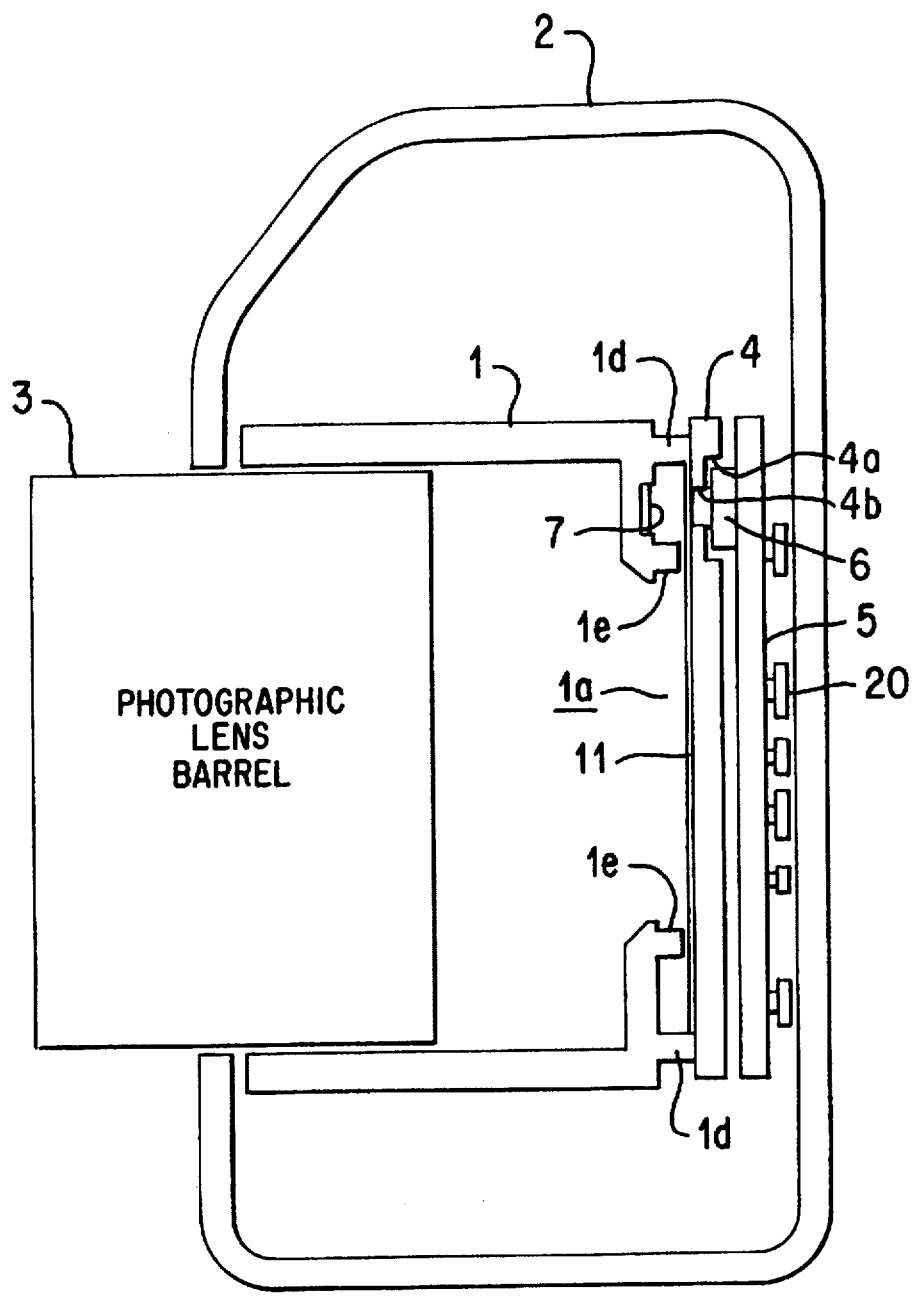
FIG. 1 is a broken-away side elevational view of a camera according to the present invention.

FIG. 1 is a broken-away side elevational view of a camera according to the present invention. A cover 2 encloses a camera body 1. A photographic lens barrel 3 is disposed at the front of the camera. The body 1 defines an aperture 1a.

The aperture 1a establishes the exposure region of the film. A reflection member 7 is attached to the body 1 and disposed within the aperture 1a.

A pressure plate 4 is attached to a rear surface of the main body 1. A photosensor 6 extends into an indentation 4a on the rear of the pressure plate 4. A channel 4b extends through the pressure plate 4, from the front to the rear at the indentation 4a.

Figure 2:
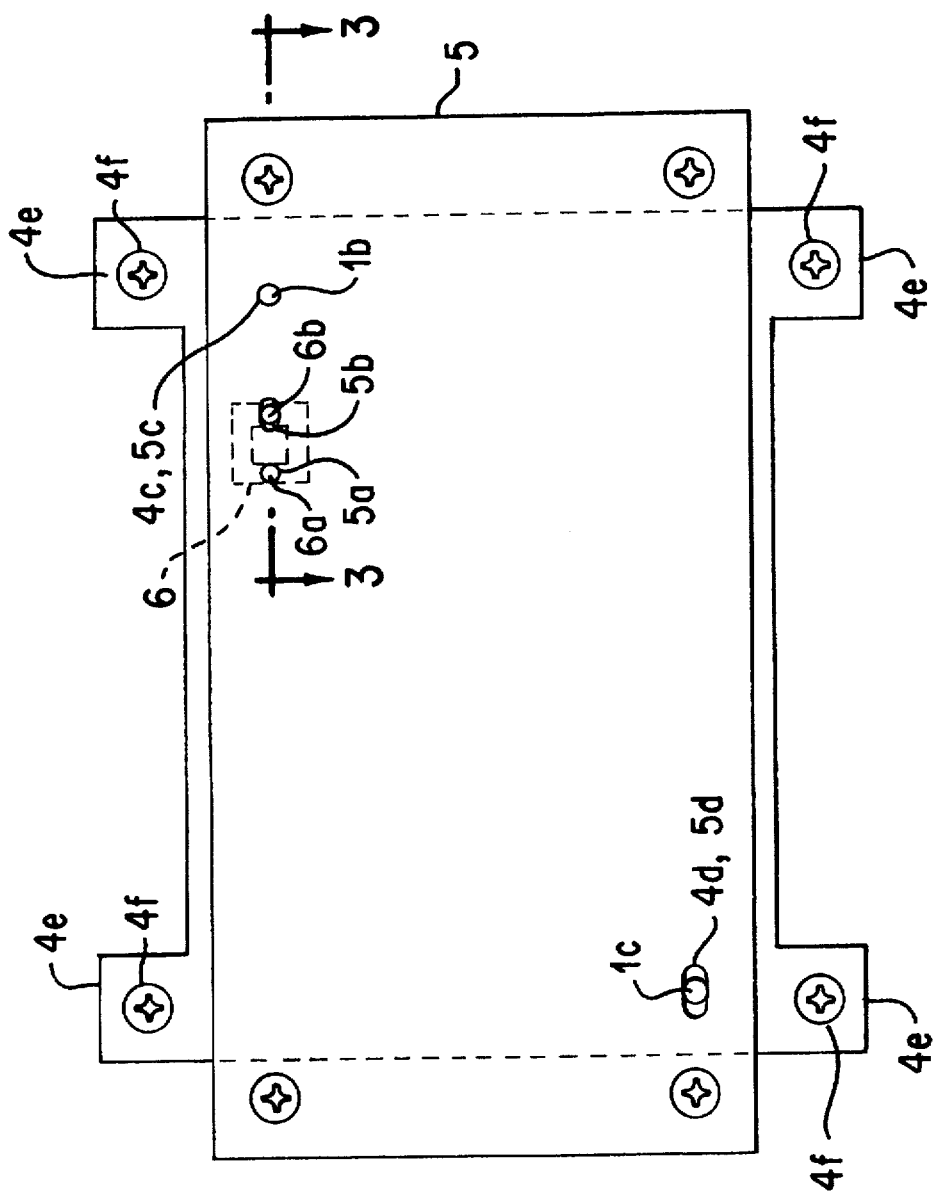
FIG. 2 is a broken-away rear elevational view of a portion of the camera of FIG. 1.
Figure 3:
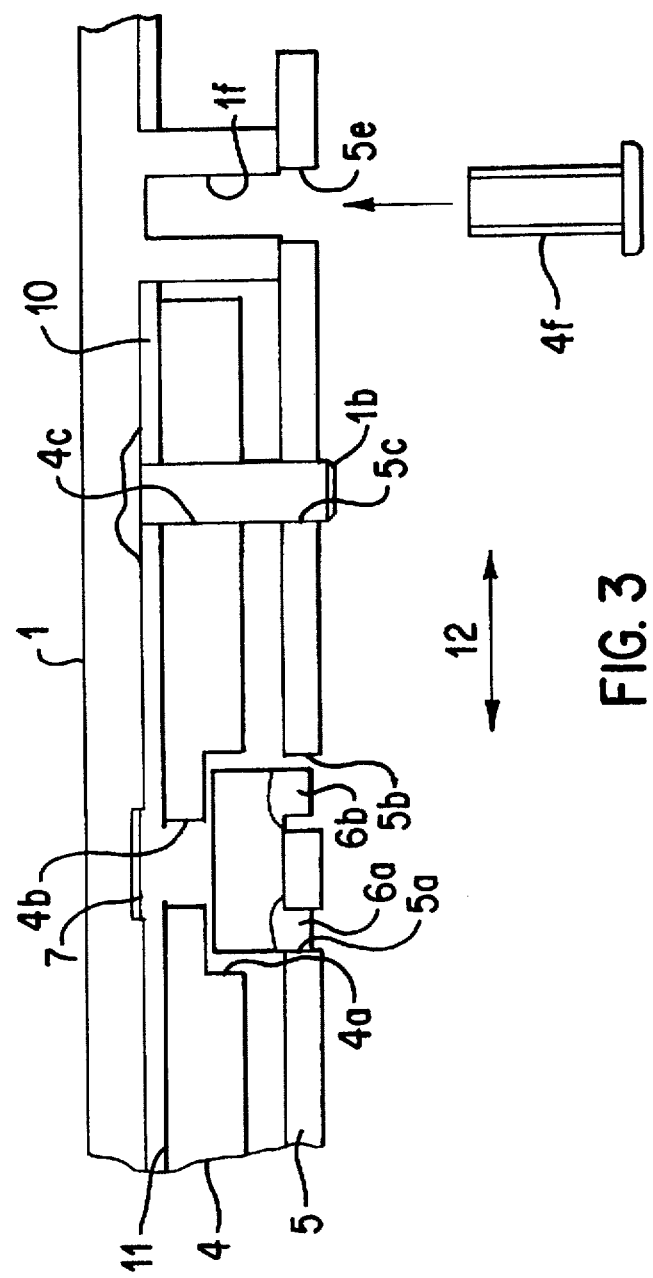
FIG. 3 is an enlarged a broken-away view taken along plane 3—3 of FIG. 2.

The pressure plate 4 defines positioning holes 4c and 4d, as shown in FIGS. 2 and 3. Positioning hole 4d is elongated. Extended parts 4e of the pressure plate 4 define the desired position of four installation holes. Screws 4f are extendable through the installation holes of the extended parts 4e.

In the installation of the pressure plate 4, the pressure plate 4 is aligned relative to the body 1. Bosses 1b and 1c protruding from the body 1 extend through positioning holes 4c and 4d to hold the pressure plate 4 in place relative to the body 1. The screws 4f are subsequently inserted into the installation holes of the extended parts 4e, and extend into corresponding openings in the body 1. The screws 4f secure the pressure plate 4 to the body 1.

A film pathway 10 is defined between the pressure plate 4 and the body 1. Reflection member 7 and channel 4b of the pressure plate 4 are disposed on opposite sides of the upper part of the film pathway 10. The film 11 travels through the film pathway 10 in direction 12, as shown in FIG. 3. The film 11 terminates at a spool (not shown) after passing through the film pathway 10.

Outer rails 1d protrude from the rear of the body 1. As the film 11 travels through the film pathway 10, its movement in a direction of the width of the film 11 is restricted by the outer rails 1d of the body 1. A set of inner rails 1e also protrude from the rear of the body 1. The inner rails 1e are spaced from the outer rails 1d toward an interior of the camera. As the film 11 travels through the film pathway 10, its movement in a direction of the thickness of the film 11 is restricted by the pressure plate 4 and the inner rails 1e of the body 1.

The film 11 includes a section having perforations. The section having perforations- defines multiple perforations along the length of the film 11 at determinable intervals. The section of the film 11 having perforations is disposed between the channel 4b and the reflection member 7 as the film 11 travels through the film pathway 10.

An installation board 5 is disposed adjacent the rear surface of the pressure plate 4. A photosensor 6 is attached to the installation board 5. Switches for other electronic devices 20 can also be attached to the installation board 5. The photosensor 6 has a projector. The projector projects light. The photosensor 6 also has a light receptor. The light receptor outputs an electronic signal that corresponds to the amount of light it receives. The output of the light receptor is input into a control device (not shown).

Bosses 6a and 6b are attached to the exterior of the photosensor 6. The bosses 6a and 6b protrude from a rear of the photosensor 6. Pressing the bosses 6a and 6b into positioning holes 5a and 5b of the installation board 5 secures the photosensor 6 to the board 5.

The installation board 5 defines a second set of positioning holes 5c and 5d. Positioning hole 5d is elongated. Screws 5f extend through installation holes 5e of the installation board 5.

In the installation of the installation board 5, the installation board 5 is aligned relative to the pressure plate 4 and the body 1. The bosses 1b and 1c of the body 1 extend through positioning holes 5c and 5d of the installation board 5 to hold the installation board 5 in place relative to the pressure plate 4 and the body 1. The screws 5f extend through holes 5e of the installation board 5 and are inserted into screw holes 1f of the body 1. The screws 5f secure the installation board 5 to the body 1. The photosensor, and any switches for other electronic devices attached to the installation board 5, are thereby aligned relative to the body 1 and the pressure plate 4.

The above-described assembly enables the installation board 5 to be positioned relative to the pressure plate 4 and the body 1, because the pressure plate and the installation board 5 are both positioned by bosses 1b and 1c attached to the body 1. This assembly enables the photosensor 6 to be disposed within the indentation 4a of the pressure plate 4, and to face the reflection member 7 through channel 4b and the film pathway 10. Specifically, the photosensor 6 is provided with an unobstructed view of the section of the film 11 having perforations as the film 11 travels along the film path 10.

The above-described assembly provides for the efficient installation of a photosensor within a camera. Specifically, the invention obviates having to wire a photosensor attached to a pressure plate. The invention also provides for the easy alignment of the photosensor with the section of the film having perforations.

In the operation of a camera constructed according to the invention, film 11 is pulled from a film cartridge (not shown). The film 11 travels through the film pathway 10. The section of the film 11 having perforations passes between the photosensor 6 and the reflection member 7. When a perforation of the film 11 is positioned opposite the photosensor 6, the light radiating from the light projector of the photosensor passes through both channel 4b of the pressure plate 4 and the perforation of the film 11. The light is reflected by the reflection member 7 and travels back through the perforation of the film 11 and the channel 4b of the pressure plate 4. The light terminates at the light receiving component of the photosensor 6.

When a perforation of the film 11 is not positioned opposite the photosensor 6, the light emitted from the light projector passes through the channel 4b of the pressure plate 4. The light is reflected by the film 11 and terminates at the light receiving component of the photosensor. The reflection efficiency of the reflection member 7 is higher than that of the film 11. The light receiver can thereby determine whether or not a perforation is positioned opposite the photosensor. The movement of the film 11 is stopped when the camera control circuit determines that a specific perforation is opposite the photosensor.

The invention enables the photosensor 6 to be precisely positioned relative to the aperture 1a of the body 1. The camera control circuit is thereby able to stop the film 11 to position a specific frame of film 11 within the aperture 1a of the body 1 based upon the output of the light receiver of the photosensor. The invention, therefore, prevents double exposing frames of film 11.

The method of aligning the body 1, pressure plate 4, and installation board 5 does not have to be accomplished with cooperating bosses and openings. Other methods of holding the pressure plate 4 and the installation board 5 in place relative to the body 1 and each other can be used, such as connecting brackets.

The photosensor does not have to include a photoreflector, even when the invention includes a photointerrupter facing the light projector and light receptor.

The invention does not have to be incorporated into a camera. For example, the invention can be incorporated into film data recording devices, or devices wherein exposed film images are displayed on a screen.

The pressure plate does not have to include a channel. Instead, a transparent material can be formed in the pressure plate.

A separate installation board does not have to be used. The photosensor can be installed at existing electronic components of the camera.

According to the present invention, a photosensor is installed on an installation board. The installation board is separate from the pressure plate. The photosensor faces a section of the film having perforations through a channel of the pressure plate. The invention, therefore, obviates wiring the photosensor attached to the pressure plate. The invention provides construction advantages over conventional cameras which attach directly the photosensor to the pressure plate.

The installation board is aligned relative to the camera body. This alignment enables the film to be accurately positioned relative to the body. The film can, therefore, be positioned accurately relative to the aperture of the body. The invention accurately spaces the frames of film apart from each other, which prevents frames from being double exposed.

The pressure plate and the installation board are both positioned by engaging bosses protruding from the rear of the camera or optical instrument body. This arrangement reduces the number of components required for engagement of the installation board and the pressure plate to the standard member of such camera or optical instrument body. The arrangement also enables the installation board to be positioned accurately relative to the pressure plate. The photosensor and the channel of the pressure plate are thereby positioned accurately. The invention provides for the efficient assembly of a camera having a photosensor. The invention, therefore, reduces the manufacturing costs of cameras.

What is claimed is:

1. A device for detecting perforations in film, the film including a section having a plurality of perforations disposed along a length of the film at determinable intervals, the film movable along a film path, said device comprising:

a body having a rear and a body position setting portion provided rearward of said rear of said body;

a pressure plate disposed at the rear of the body that maintains the alignment of the film relative to the body, said pressure plate having a rear and a channel and a pressure plate position setting portion positioned in axial alignment with said body position setting portion;

an installation board adjacent the rear of the pressure plate and said installation board having an installation board position setting portion positioned in axial alignment with said body position setting portion; and a sensor attached to the installation board and disposed to face the section of the film having perforations through the channel of the pressure plate as the film moves along the film path;

whereby the sensor transmits electronic signals corresponding to the position of the perforations of the film as the film moves along the film path.

2. The device according to claim 1, wherein the pressure plate and the installation board each define multiple positioning holes, and the body includes multiple members projecting from the rear of the body, whereby the pressure plate and installation board are positioned by aligning the projection members with the positioning holes.

3. The device according to claim 1, further including a reflection member at the rear of the body, in close proximity to said channel, and the sensor includes a light projector and a light receiver, whereby when a perforation of the film is disposed in the film path and aligned with said channel opposite the sensor, light projected by the light projector is reflected by the reflection member and terminates at the light receiver.

4. The device according to claim 3, further comprising electronic components relating to the operation of the device attached to the installation board.

5. A device for detecting perforations in film, the film including a section having a plurality of perforations disposed along a length of the film at determinable intervals, the film movable along a film path, comprising:

body means having a rear and a body position setting portion provided rearward of said rear of said body means;

pressure plate means disposed at the rear of the body means for maintaining the alignment of the film relative to the body means, said pressure plate means having a rear and a channel and a pressure plate position setting portion positioned in axial alignment with said body position setting portion;

installation board means adjacent the rear of the pressure plate means and said installation board means having an installation board position setting portion positioned in axial alignment with said body position setting portion; and sensor means attached to the installation board means and disposed to face the section of the film having perforations through the channel of the pressure plate means as the film moves along the film path;

whereby the sensor means transmits electronic signals corresponding to the position of the perforations of the film as the film moves along the film path.

6. The device according to claim 5, wherein the pressure plate means and the installation board means each define multiple positioning holes, and the body means includes multiple members projecting from the rear of the body means, whereby the pressure plate means and installation board means are positioned by aligning the projection members with the positioning holes.

7. The device according to claim 5, further including a reflection member at the rear of the body means, and the sensor means includes a light projector and a light receiver, whereby when a perforation of the film is disposed in the film path opposite the sensor means, light projected by the light projector is reflected by the reflection member and terminates at the light receiver.

8. The device according to claim 7, further comprising electronic components relating to the operation of the device attached to the installation board means.

9. A method of detecting perforations in film, the film including a section having a plurality of perforations disposed along a length of the film at determinable intervals, the film movable along a film path, said method comprising the steps of:

aligning a body having a rear with a pressure plate disposed at the rear of the body and with an installation board disposed adjacent a rear of the pressure plate by aligning a body position setting portion provided rearward of the rear of the body with a pressure plate position setting portion and an installation board position setting portion along a common axis;

maintaining the alignment of the film relative to said body with said pressure plate disposed at the rear of the body;

sensing the perforations of the film with a sensor attached to said installation board adjacent the rear of the pressure plate, the sensor disposed to face the section of the film having perforations through the channel of the pressure plate as the film moves along the film path; and transmitting electronic signals corresponding to the position of the perforations of the film as the film moves along the film path.

10. The method according to the steps of claim 9, further comprising the step of positioning the pressure plate and installation board by aligning multiple members projecting from the rear of the body with positioning holes defined in the pressure plate and the installation board.

11. The method according to the steps of claim 9 whereby the sensing step includes projecting light from a light projector of said sensor that transmits light through said film perforations, reflecting light with a light reflector back towards said sensor, and receiving light with a light receiver of said sensor.

12. The device according to claim 1, wherein:

said body position setting portion is a boss, said pressure plate position setting portion is an opening through said pressure plate and said installation board position setting portion is an opening through said installation board.

13. The device according to claim 5, wherein:

said body position setting portion is a boss, said pressure plate position setting portion is an opening through said pressure plate means and said installation board position setting portion is an opening through said installation board means.

* * * * *